United States Patent [19]
Adelstein

[11] Patent Number: 5,816,105
[45] Date of Patent: Oct. 6, 1998

[54] THREE DEGREE OF FREEDOM PARALLEL MECHANICAL LINKAGE

[75] Inventor: Bernard D. Adelstein, San Mateo, Calif.

[73] Assignee: The United States of America as represented by the Administrator of the National Aeronautics and Space Administration, Washington, D.C.

[21] Appl. No.: 700,584

[22] Filed: Jul. 26, 1996

[51] Int. Cl.$^6$ .............................. B25J 9/00; B25J 19/02; G05G 13/00
[52] U.S. Cl. ................................. 74/471 XY; 74/490.03; 318/568.11; 901/9; 901/23; 901/46; 345/161
[58] Field of Search .......................... 74/490.01, 490.03, 74/471 XY; 901/9, 15, 18, 19, 23, 46; 414/729; 318/568.11, 568.12; 345/161

[56] References Cited

U.S. PATENT DOCUMENTS

| | | | |
|---|---|---|---|
| 4,630,500 | 12/1986 | Suzuki | 74/473 |
| 4,976,582 | 12/1990 | Clavel | 414/729 |
| 5,149,023 | 9/1992 | Sakurai et al. | 244/229 |
| 5,222,400 | 6/1993 | Hilton | 73/862 |
| 5,316,435 | 5/1994 | Mozingo | 414/685 |
| 5,333,514 | 8/1994 | Toyoma et al. | 74/479 |
| 5,360,312 | 11/1994 | Mozingo | 414/685 |
| 5,379,663 | 1/1995 | Hara | 74/474 |
| 5,388,935 | 2/1995 | Sheldon | 409/201 |
| 5,459,382 | 10/1995 | Jacobus | 318/568.11 |
| 5,480,276 | 1/1996 | Mozingo | 414/685 |
| 5,497,847 | 3/1996 | Ota et al. | 180/333 |
| 5,587,937 | 12/1996 | Massie et al. . | |

FOREIGN PATENT DOCUMENTS

| | | | |
|---|---|---|---|
| 1472252 | 4/1989 | U.S.S.R. | 414/729 |

OTHER PUBLICATIONS

Adelstein, B.D., and Rosen, M.J., 1992, "Design and Implementation of a force reflecting manipulandum for manual control research," Advances in Robotics, DSC–vol. 42, ASME, New York, pp. 1–12.

Ellis, R.E., Ismaeil, O.M., Lipsett, M.G., 1993, "Design and evaluation of a high performance prototype planar haptic interface," Advances in Robotics, Mechatronics, and Haptic Interfaces, DSC–vol. 49, ASME, New York, pp. 55–64.

(List continued on next page.)

*Primary Examiner*—Rodney H. Bonck
*Assistant Examiner*—Troy Grabow
*Attorney, Agent, or Firm*—Kathleen Dal Bon; Harry Lupuloff; John G. Mannix

[57] ABSTRACT

A three degree of freedom parallel mechanism or linkage that couples three degree of freedom translational displacements at an endpoint, such as a handle, a hand grip, or a robot tool, to link rotations about three axes that are fixed with respect to a common base or ground link. The mechanism includes a three degree of freedom spherical linkage formed of two closed loops, and a planar linkage connected to the endpoint. The closed loops are rotatably interconnected, and made of eight rigid links connected by a plurality of single degree of freedom revolute joints. Three of these revolute joints are base joints and are connected to a common ground, such that the axis lines passing through the revolute joints intersect at a common fixed center point K forming the center of a spherical work volume in which the endpoint is capable of moving. The three degrees of freedom correspond to the spatial displacement of the endpoint, for instance. The mechanism provides a new overall spatial kinematic linkage composed of a minimal number of rigid links and rotary joints.

The mechanism has improved mechanical stiffness, and conveys mechanical power bidirectionally between the human operator and the electromechanical actuators. It does not require gears, belts, cable, screw or other types of transmission elements, and is useful in applications requiring full backdrivability. Thus, this invention can serve as the mechanical linkage for actively powered devices such as compliant robotic manipulators and force-reflecting hand controllers, and passive devices such as manual input devices for computers and other systems.

12 Claims, 8 Drawing Sheets

OTHER PUBLICATIONS

Massie, T.H., and Salisbury, J.K., 1994, "The Phantom haptic interface: a device for probing virtual objects," Dynamic Systems and Control 1994, DSC–vol. 55–1, ASME, New York, pp. 295–301.

Buttolo, P., and Hannaford, B., 1995, "Advantages of actuation redundancy for the design of haptic displays," Proceedings, ASME Dynamic Systems and Control Division, DSC–vol. 57–2, ASME, New York, pp. 623–630.

Millman, P.A., Stanley, M., and Colgate, J.E., 1993, "Design of a high performance haptic interface to virtual environments," Proceedings, IEEE Virtual Reality Annual International Symposium, Seattle, WA, pp. 216–222.

Kazerooni, H., 1995, "The human power amplifier technology at the University of California Berkeley," Proceedings, ASME Dynamic Systems and Controls Division, DSC vol. 57–2, ASME, New York, pp. 605–613.

Iwata, H., 1990, "Artificial Reality with force–feedback: development of desktop virtual space with compact master manipulator," Computer Graphics, 24, 165–170.

Hui, R., Ouellet, A., Wang, A., Kry, P., Williams, S., Vukovich, G., and Perussini, W, 1995, "Mechanisms for haptic feedback," Proceedings, IEEE Int. Conf. Robotics and Automation, Nagoya, Japan, pp. 2138–2143.

Lindemann, R., and Tesar, D., 1989, "Construction and demonstration of a 9–string six dof force reflecting joystick for telerobotics," Proceedings, NASA Conference on Space Telerobotics, vol. 4, JPL Publication 89–7, pp. 55–63.

Marshall, W.C., DeMers, R.E., Schipper, B.W., and Levitan, L., 1993, "Synergistic computing applied to a virtual–pivot six–degree–of–freedom hand controller designed for aerospace telerobotics," Proceedings, AIAA Computing in Aerospace IX, San Diego, CA, AIAA 93–4506.

Gosselin, C., and Angeles, J., 1989, "The optimum kinematic design of a spherical three–degree–of–freedom parallel manipulator," ASME J. Mech., Trans., and Automation in Design, 111, 202–207.

Berkelman, P.J., Hollis, R.L., and Salcudean, 1995, "Interacting with virtual environments using a magnetic levitation haptic interface," Proceedings, IEEE/RSJ Int. Conf. on Intelligent Robots and Systems, Pittsburgh, Pennsylvania, vol. 1, pp. 117–122.

THREE DEGREE OF FREEDOM PARALLEL MECHANICAL LINKAGE

ORIGIN OF INVENTION

The invention described herein was made in the performance of work under a NASA contract and is subject to the provision of Section 305 of the National Aeronautics and Space Act of 1958, Public Law 85-568 (72 Stat. 435; 42 U.S.C. 2457).

BACKGROUND OF THE INVENTION

1. Technical Field of the Invention

The present invention relates in general to three degree of freedom mechanical manipulators. It more specifically relates to a mechanism or interface that can serve as a mechanical linkage for actively powered devices such as compliant robotic manipulators and force-reflecting hand controllers, and as a passive device such as a manual input device for computers and other systems.

2. Description of the prior Art

Existing three degree of freedom manipulators employ general linkage configurations found both in two and higher degree of freedom manipulators. The simplest linkage configuration, called "direct-drive" has each actuator located directly at the joint between a pair of adjacent links: a distal link and a proximal link. Typically, the proximal link, that is the link closest to the base, is attached to the actuator fixed element or the stator, and the distal link is attached directly to the actuator moving element or the rotor. The disadvantage of direct drive manipulators is that each link must carry both the inertia and weight of the next joint actuator. Consequently, to support this weight, larger actuators, as well as stiffer and more massive links are required. This, in turn, further increases inertia and weight.

An alternate conventional linkage employs one or more transmission elements of various types between an actuator and the distal component which it drives. One class of conventional transmissions comprises more complicated elements such as gears and ball-screw drives and gear-like reducers, and belt and pulley or cable and pulley mechanisms. Another class of transmissions is made from linkages composed of simple rotary or prismatic joints and rigid link couplers. These simple joints are typically implemented with ball bearing, or other rolling contact bearing elements. Manipulators employing the simple joint and rigid link transmissions are often called "parallel" or "in-parallel" in the robotics literature. Direct-drive manipulators are termed "serial" or "in-series." Manipulators based on combinations of serial and parallel linkage components have also been developed.

The foregoing transmission elements are intended to fulfill one or more of the following roles in manipulator linkages. They serve to transform rotary into linear motion (or vice versa), reduce speed and multiply force (or vice versa), and transfer motion and force from one location in the linkage to another. By incorporating transmissions of the various forms described above, actuators may be located remotely from the joints that they drive. In some manipulators, transmission elements allow all actuators to be mounted on a common base link or ground, thereby reducing significantly the weight and inertia that must be carried, and thus decreasing the power requirements and size for the actuators.

The drawbacks of the various higher pair transmissions include backlash in toothed drives, e.g., gears, timing chains, timing belts, and excessive compliance especially in belt and cable systems. Both backlash and compliance can cause inaccuracy in linkage endpoint displacements as measured by sensors located at the actuators. Because backlash results when the teeth of the driving and driven elements loose contact with each other, gears and toothed belts also lead to output force fluctuations. Similarly, slip or creep in some belt and cable systems can also cause force and displacement inaccuracies. Compliance has the further effect of lowering the mechanical bandwidth of the linkage joining endpoint to actuators. Friction, inherent in gear and tensioned belt and cable transmissions, dissipates force applied by the actuators and at the endpoint of a linkage. These friction losses inhibit backdrivability, that is the ability to push a linkage at its endpoint and have it move freely, a vital feature for both passive and active hand controllers, and for the implementation of many compliant robot control strategies.

"Parallel" configurations exploit beneficial aspects of both transmission and direct-drive linkage designs by allowing the endpoint to be driven by remote actuators while still excluding the higher pair elements and associated cogging, compliance, backlash, and friction described above. In comparison with serial linkages, parallel configurations have more involved mathematical expressions to describe mechanism kinematics, smaller work space for a given set link lengths, and more complex fabrication, tolerancing, and assembly procedures to meet alignment requirements. Failure to meet these tighter alignment requirements can result in link bending, which causes the linkage to seek "preferred locations" that minimize elastic deformation, and in binding friction. These problems grow with the number of closed loops present in the mechanism. However, when executed properly, designs with multiple loops have the advantage of greater structural stiffness because of additional paths that join the linkage endpoint to ground.

Passive input devices adhere to the same kinematic design principles described above in relation to powered devices (e.g., manipulators and force reflecting hand controllers). However, as passive input devices do not include actuators, they retain only the collocated motion sensors of powered devices.

SUMMARY OF THE INVENTION

The present invention provides a unique three degree of freedom parallel mechanism or interface that couples three degree of freedom translational displacements at an endpoint, such as a handle, a hand grip, a robot tool, etc., to link rotations about three axes that are fixed with respect to a common base or ground link. The three degrees of freedom correspond to the spatial displacement of the endpoint. Such three degrees of freedom of spatial displacement resolve into Cartesian coordinates (X, Y, Z), and enable movement within a spherical volume.

The mechanism of the present invention provides a new overall spatial kinematic linkage composed of a minimal number of rigid links and rotary joints that are arranged in three closed chain loops of six binary (two-joint) and four ternary (three-joint) links. In one embodiment, the mechanism includes 10 rigid links and 12 rotary joints that combine an eight-link, two-loop spherical linkage with a single-loop planar linkage.

By mounting rotary joints or actuators at each of the three base axes, rotations can be generated causing the endpoint to move. Conversely, endpoint motion can be measured by transducers that directly sense rotation about each of the linkage's three base axes.

The present three degree of freedom parallel does not require electrohydraulic actuation as a mechanical power source. In this invention, the mechanism further conveys mechanical power bidirectionally between the human operator and electromechanical actuators.

Briefly, the foregoing and other features of the present invention are achieved by providing a unique three degree of freedom parallel mechanism comprised of a spherical linkage coupled to a planar linkage that can be constructed solely of rigid links and revolute joint pairs, and does not require gears, belts, cable, screw or other types of transmission elements. Consequently, the mechanism is useful in applications requiring full backdrivability, and can serve as the mechanical linkage for actively powered devices such as compliant robotic manipulators and force-reflecting hand controllers, and passive devices such as manual input devices for computers and other systems.

All interactions at the endpoint can occur through a single point where only forces, as opposed to arbitrary rigid body moments or couples, are applied. By restricting the mechanism to three degrees of freedom, the present linkage reduces design and fabrication complexity. In addition, the mechanism offers a singularity free work volume within either half of two adjacent hemispheres, and simplifies forward and inverse kinematic equations in comparison with other three degree of freedom "parallel" linkage designs. Furthermore, the present mechanism simplifies component alignment and assembly by virtue of all the base joints (e.g., actuators / sensors) axes (X—X, Z—Z) being aligned along two perpendicular axes in a single plane, and by having all revolute joint axes aligned in one of three perpendicular axes (X—X, Y—Y, Z—Z), compared with other tripod base three and six degree of freedom devices that require 120 degree axis separation at their bases. Reference is made to U.S. Pat. No. 4,976,582 to Clavel, which is incorporated herein by reference.

BRIEF DESCRIPTION OF THE DRAWING

The above and other features of the present invention and the manner of attaining them, will become apparent, and the invention itself will be best understood, by reference to the following description and the accompanying drawing, wherein.

Similar numerals refer to similar elements in the drawing. It should be understood that the sizes of the different components in the Figures are not in exact proportion or to scale, and are shown for visual clarity and for the purpose of explanation.

DETAILED DESCRIPTION OF THE INVENTION

Figure 1:
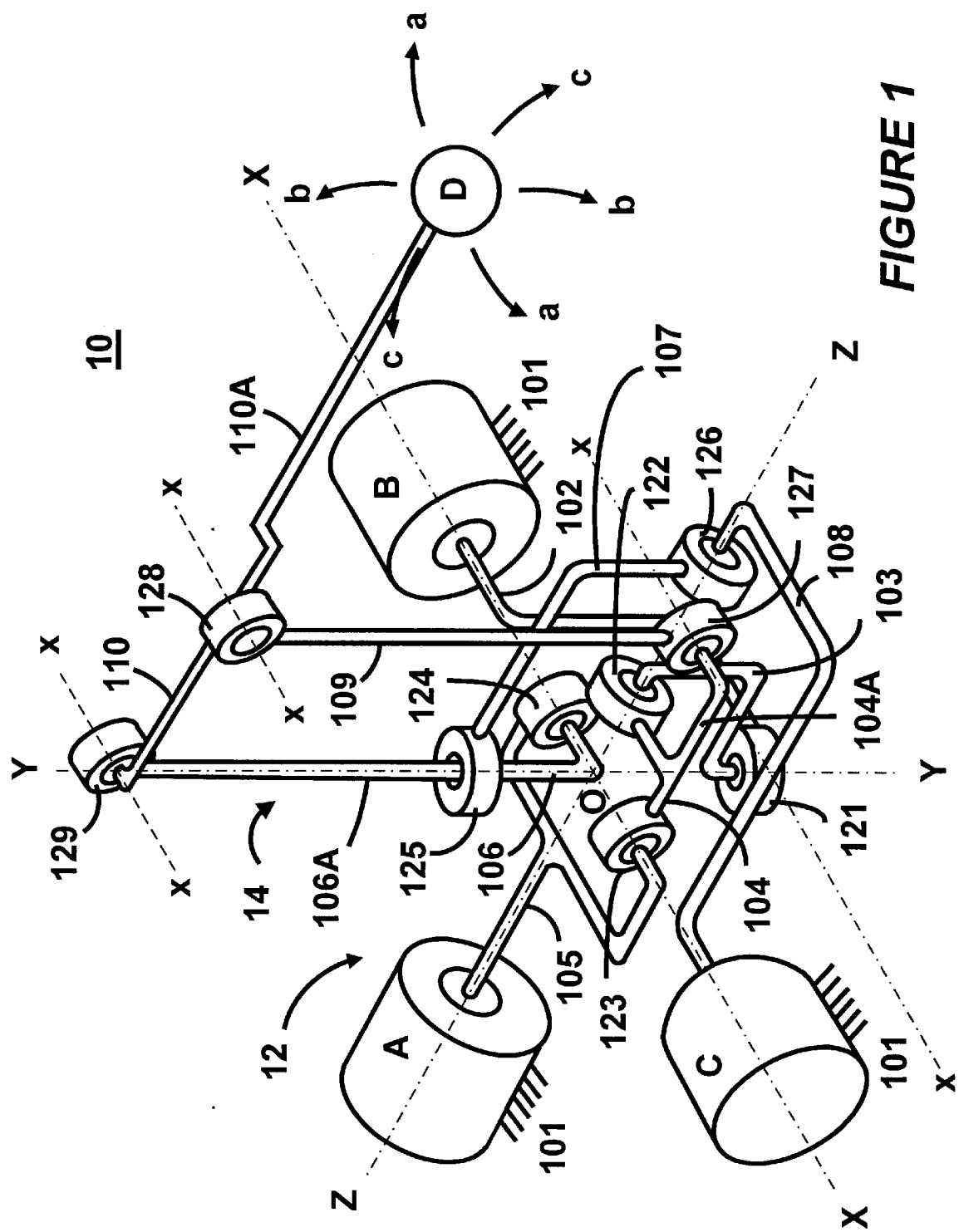
FIG. 1 is an isometric view of a three degree of freedom parallel mechanism according to the present invention, shown in a "nominal position"

A three degree of freedom mechanism or interface 10 according to the present invention is depicted as a kinematic model in FIG. 1. The mechanism 10 may be a force reflecting interface that forms a part of a three dimensional haptic virtual environment, a three dimensional robotic manipulator, or in higher degree of freedom devices. As used herein, "haptic" perception is the process through which humans explore and evaluate the physical characteristics, such as size, weight, shape, stiffness, viscosity, of objects or fields, such as field of gravity, in their immediate or remote surroundings. Haptic perception of mechanical characteristics involves the cognitive integration of sensory input from displacement velocity and force sensors in the muscles and joints, as well as tactile sensors in the skin induced between the limbs and the environment.

The mechanism 10 is comprised of two main components. The first component includes a three degree of freedom spherical linkage 12, and the second component includes a planar linkage 14. As it will be detailed later, the spherical linkage 12 forms the base of the mechanism 10, and includes two closed loops formed of a minimal number of links and single degree of freedom rotary joints. It is termed spherical because the axis lines through all the rotary joints between the links intersect at a common center point O, as would lines drawn normal to the surface of a hypothetical sphere. The planar linkage 14 preferably includes one closed loop (third closed loop) that is similarly formed of a minimal number of links and rotary joints, in which the axis lines of all the rotary joints remain parallel.

Figure 2:
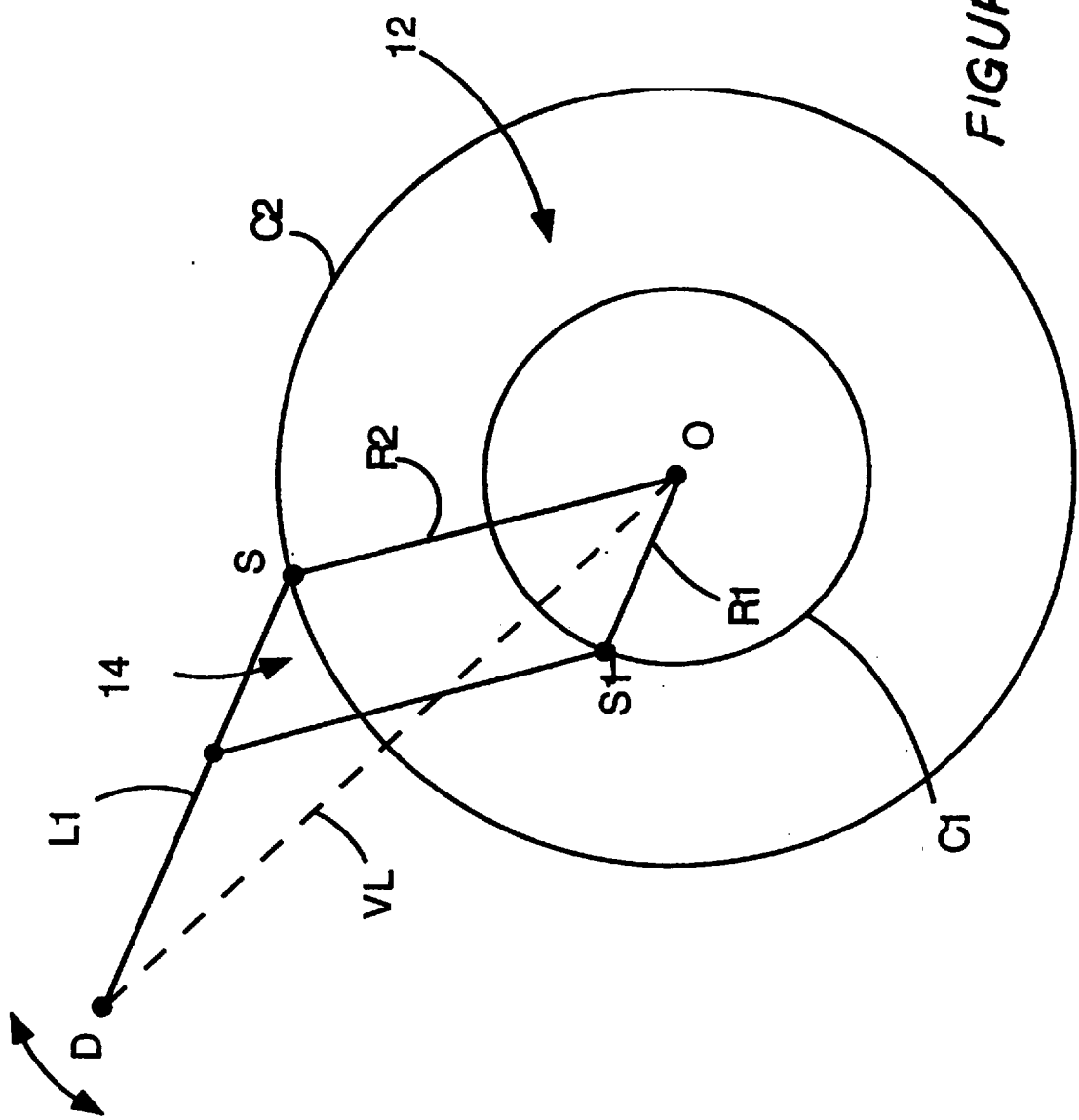
FIG. 2 is a simplified planar representation of the mechanism of FIG. 1.
Figure 3:
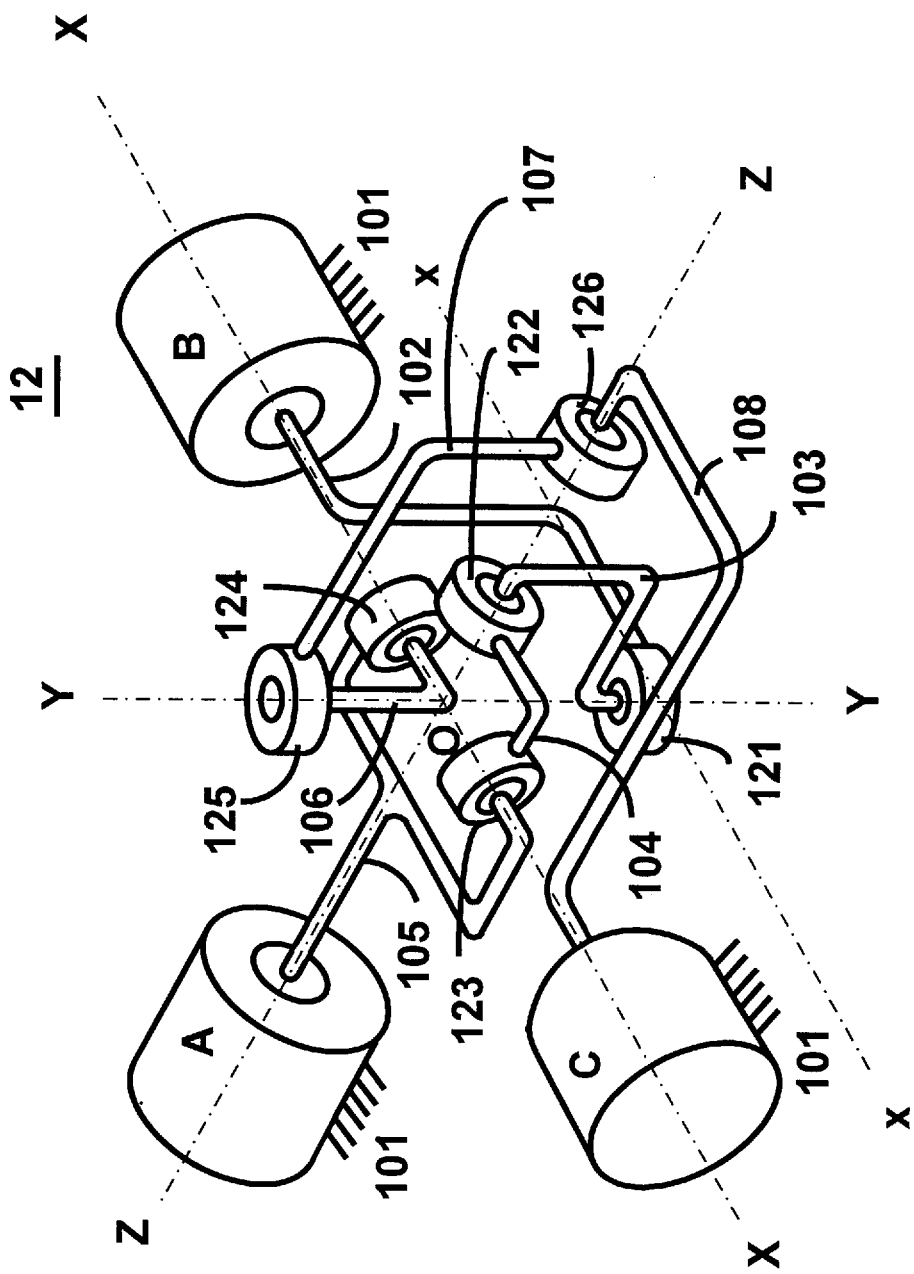
FIG. 3 is an isometric view of a spherical linkage forming part of the mechanism of FIG. 1.

With reference to FIG. 2, the spherical linkage 12 is represented by an inner circle C1 with a center point O and a radius R1 formed by the addition of extension link (i.e., 104A) as will be explained later in connection with FIG. 1. The inner circle C1 is concentric relative to the outer circle C2 which also has point O as its center. The outer circle C2 has a radius R2, and represents an extended spherical linkage formed by the addition of an extension link (i.e., 106A), as it will be explained later in connection with FIG. 1. The planar linkage 14 is represented by a line that intersects the outer circle C2 at a point S, and that terminates in an endpoint D. The planar linkage 14 includes a fixed length L1, which is the distance between points S and D. In this illustration, point S has a two degree of freedom motion capability, and can move freely along the surface of a fixed spherical volume represented by the circle, while the endpoint D has a one degree of freedom motion capability relative to point S, and is allowed to move radially inward and outward with respect to the spherical center O. As a result, the planar linkage 14 can be considered equivalent to a virtual link VL. Virtual link VL is defined between points O and D, and its length changes to permit the endpoint D to move to any point within a spherically shaped work volume having point O as its center and VL as its radius, provided internal linkage interference avoided. The maximum value of the virtual link VL, or the radius of the spherical work volume is defined by the following equation (1):

$$VL(max) = R2 + L1 \qquad (1)$$

The spherical linkage 12 is further illustrated in FIGS. 3 through 7. In this particular embodiment, spherical linkage 12 is formed of eight links 101, 102, 103, 104, 105, 106, 107 and 108 that are interconnected by nine joints. The outer bearing elements of three base joints (A, B, C) are connected to the same base. The remaining six joints are rotary joints 121, 122, 123, 124, 125, 126. The axes passing through joints A, B, C, 121, 122, 123, 124, 125, 126 intersect at a center point O. The center point O is also the origin of the Cartesian coordinate axes (X—X, Y—Y, Z—Z).

Each link 101, 102, 103, 104, 105, 106, 107, 108 is paired to its neighbors by single degree of freedom rotary joints. In addition, if the base joints A, B, C were actuators (e.g., motors), links 102, 105, and 108 may be extensions to the shafts of the motors B, A, C respectively, and thus can use the motor shaft bearings for their individual joints with ground link 101. The base joints A, B, C can drive and be driven by the endpoint D.

The location of rotary joint 127 corresponds to endpoint S1 on the inner circle C1 in FIG. 2, and enjoys a three degree of freedom displacement capability. Rotary joint 127 may be connected to one or more external endpoints, for instance endpoint D, through various connecting mechanisms. One such exemplary connecting mechanism is the planar linkage 14.

Thus, all the mechanism force and motion is transferred through transmissions made of rigid links, and single degree of freedom rotary ball bearing joints with low friction and minimal backlash.

Figure 8:
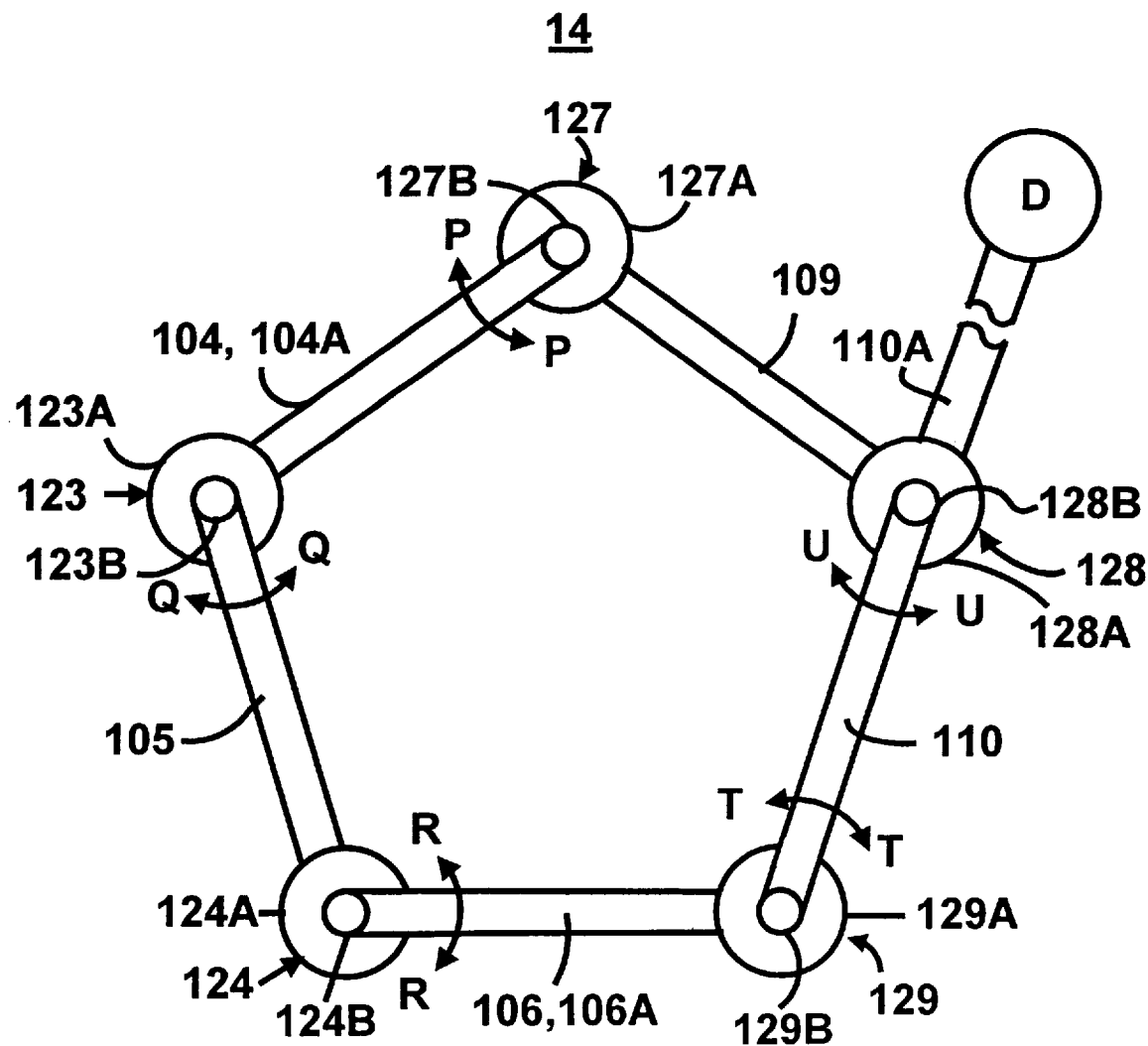
FIG. 8 is a simplified flat representation of a closed loop planar linkage forming part of the mechanism of FIG. 1.

The planar linkage 14 illustrated in FIGS. 1, 2 and 8 is a five-link, closed-loop mechanism formed by the addition of two rigid links 109 and 110 and the extension of links 104 and 106 into rigid links 104A and 106A, respectively, to the spherical linkage 12 at link 105. The endpoint D is connected to the rotary joint 127, via the planar linkage 14 and an extension link 110A of link 110.

Link 109 is connected to the spherical linkage 12 by means of rotary joint 127. Extension link 106A is connected to the spherical linkage 12 by means of link 106 and rotary joint 124. Link 110 is connected at one of its ends to the spherical linkage 12 by means of rotary joint 129, which, in turn, is connected to extension link 106A. The other end of link 110 is connected to rotary joint 128, and integrally extends into extension link 110A that terminates in endpoint D. Link 104A is connected to the spherical linkage 12 by means of rotary joint 123. In the present embodiment, all the longitudinal axes x—x passing through the rotary joints 124, 127, 128, 129 remain parallel with respect to each other. The linkage 14 allows the endpoint D to be moved radially inward and outward with respect to the center O of the spherical linkage 12.

Link 109 is connected at one of its ends to the outer bearing element 128A of joint 128, and at its other end to the outer bearing element 127A of joint 127. In an exemplary embodiment of the present invention the planar polygon formed by links 106, 106A, 109 and 110 may be, but is not required to be a parallelogram.

Link extension 104A is connected at one of its ends to the inner bearing element 127B of joint 127, and at its other end to the outer bearing element 123A of link 123. Link 104A is capable of rotating around the axis of joint 127, as shown by the arrow P.

Link 105 is rotatably connected at one of its ends to the inner bearing element 123B of joint 123, and at its other end to the outer bearing element 124A of joint 124. Link 105 is capable of rotating around the axis of joint 123, as indicated by the arrow Q.

Link extension 106A is integrally (or rigidly) connected to one end of link 106. Link 106 is connected at its other end to the inner bearing element 124B of joint 124, and link 106A is connected at its opposite end to the outer bearing element 129A of joint 129. Link 106 and link extension 106A are capable of rotating around the axis of joint 124, as indicated by the arrow R. The plane formed by link 106, extension link 106A and the parallel axes of joints 124 and 129 remains parallel to the Cartesian axis X—X. Consequently, link extension 106A and link 109 are maintained in a parallel relationship regardless of the orientation or displacement of the endpoint D.

Link 110 is rotatably connected at one end to the inner bearing element 129B of joint 129, and at its other end to the inner bearing element 128B of joint 128. Link 110 is capable of rotating around the axes of joints 129 and 128, as indicated by the arrows T and U, respectively. Link extension 110A is rigidly or integrally connected at one of its ends to link 110 and is further connected to endpoint D. The optimal length of link extension 110A may be pre-selected, and in some applications it may be elongated by an additional link extension (not shown).

With reference to equation (1) above, the effective length L1 of the planar linkage 14 is the distance between rotary joint 129, which corresponds to the endpoint S, and the endpoint D. In other terms, the effective length L1 corresponds to the lengths of link 110 and extension link 110A. The effective length L1 may be changed by selecting the length of the extension link 110A, resulting in a change in the virtual link VL between the center point O and the endpoint D. Endpoint S1 corresponds to the location of rotary joint 127, and the distance between the center point O and the endpoint S1 corresponds to the radius R1 of the spherical work volume defined by the spherical linkage 12. The distance between the endpoints S1 and B corresponds to the length of link 106 plus extension link 106A. While extension link 110A is illustrated as extending in the direction from joint 129 to joint 128, it should be understood that extension link 110A may alternatively extend in the opposite direction.

The operation of the mechanism 10 will be explained by individually locking all three base joints A, B, C, and then releasing only one of these joints at a time. Unlocking joint A while locking joints B and C enables only links 105, 106, 106A, 104, 104A, 107, 109, and 110 to move, resulting in the endpoint D motion along arc a—a. Similarly, releasing B while locking joints A and C allows movement exclusively of links 102, 103, 104, 104A, 109, and 110 and hence, motion of endpoint D along arc b—b. Freeing joint C alone permits motion of only links 108, 107, 106, 106A, 109, and 110, resulting in the endpoint D motion along arc c—c. Thus, when all three joints are free to rotate, the three arcs, a—a, b—b, and c—c sum to permit three dimensional motion at the endpoint D.

Figure 4:
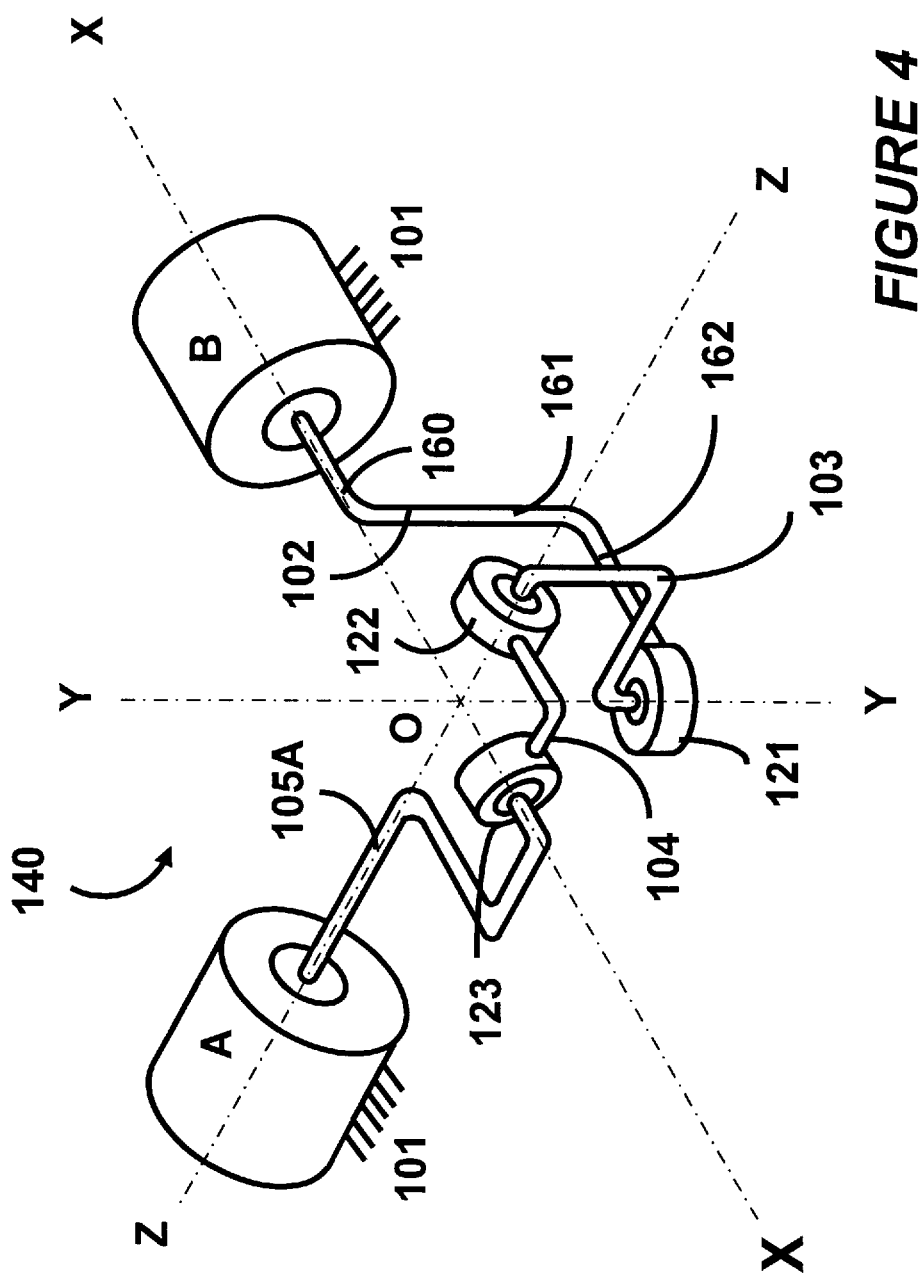
FIG. 4 is an isometric view of a first closed loop forming part of the spherical linkage of FIG. 3.
Figure 5:
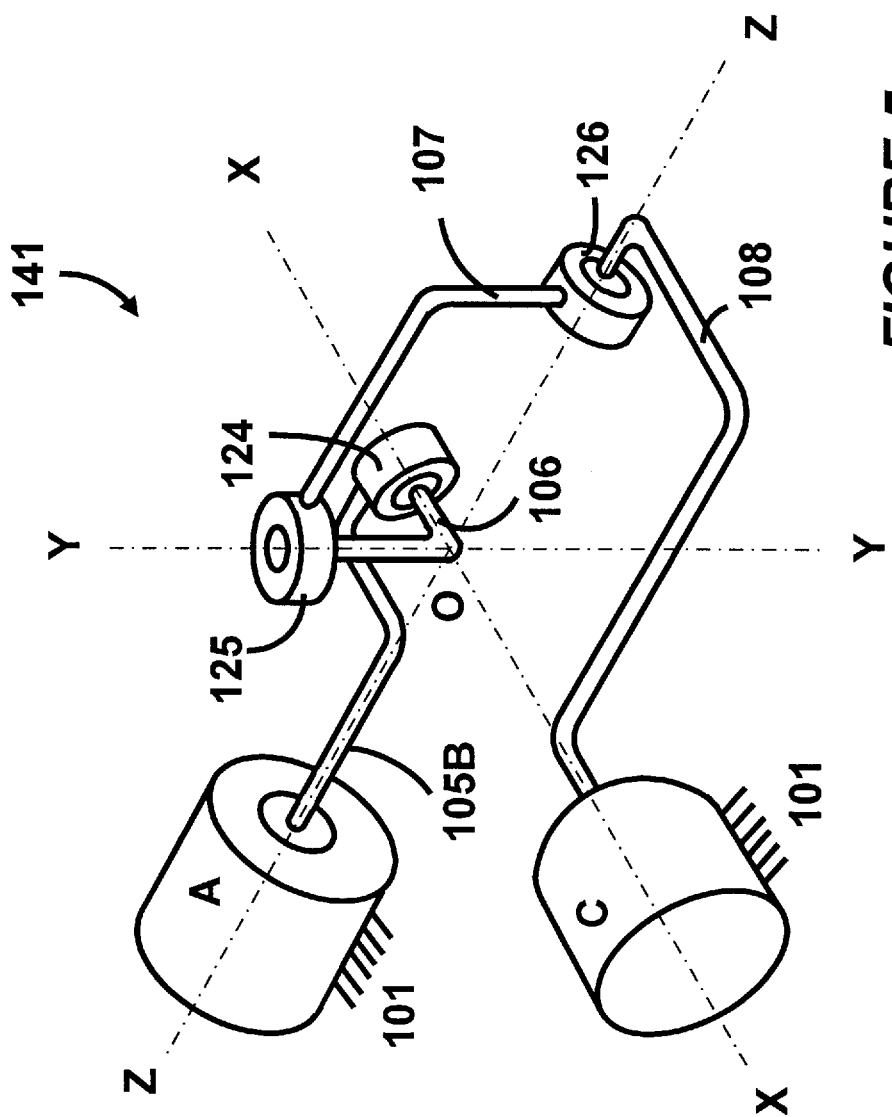
FIG. 5 is an isometric view of a second closed loop forming part of the spherical mechanism of FIG. 3.
Figure 6:
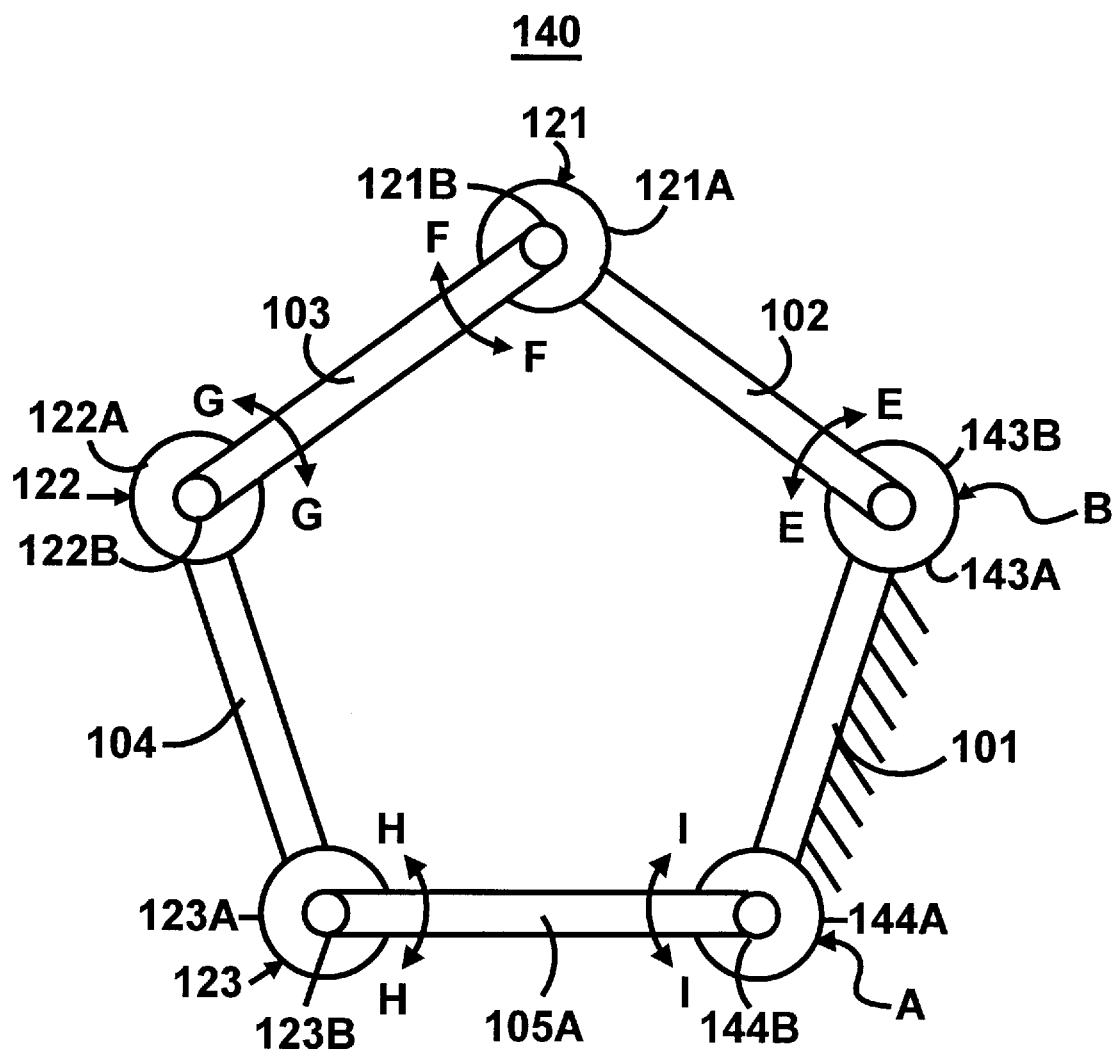
FIG. 6 is a simplified flat representation of the first closed loop of FIG. 4.

Considering now the spherical linkage 12 in more detail with respect to FIGS. 1 and 3 through 7, it is formed of two main closed loops 140, 141. FIGS. 4 and 6 respectively represent an isometric view and simplified flat representation of the closed loop 140. Similarly, FIGS. 5 and 7 respectively represent an isometric view and a simplified flat representation of the closed loop 141.

With reference to FIGS. 4 and 6, the first closed loop 140 is a five-link spherical loop, and includes the ground link 101 and four rigid links 102, 103, 104, 105A. In this particular example, link 105 branches into two links 105A and 105B, such that link 105A forms part of the first closed loop 140, and link 105B forms part of the second closed loop 141. Each of the five links 101 through 105A is paired to an adjacent link by single degree of freedom rotary joints that are represented herein for the purpose of illustration only, by an outer bearing element and an inner bearing element.

The base link 101 is a common fixed ground for the base joints A, B, C. However, the base link 101 is not required to be fixed.

The base joint B may be a rotary actuator such as a motor, a sensor, or a actuator-sensor combination. The base joint B has a single degree of freedom motion capability, and can drive and be backdriven by the endpoint D. The endpoint D can be for example, a spherical grip or an end effector in three spatial degrees of freedom.

Link 102 is rotatably connected at one of its ends to the shaft 143B (FIG. 6) of the base joint B, and at its other end to the outer bearing 121A of the rotary joint 121. In this particular embodiment, link 102 is formed of three integral members 160, 161, 162. It should however be clear that a different number of members may alternatively be selected. For instance, link 102 may be formed of a single curved member or a solid block. In this example, the shaft of the base joint B coincides with its axis of rotation and the Cartesian coordinate axis X—X. The axis of rotary joint 121 passes through the center point O and remains at an angle, for instance perpendicular, though not necessarily, relative to the axis of the base joint B. As a result, link 102 is restrained to rotate around the shaft 143B of the base joint B, as indicated by the arrow E.

Link 103 is rotatably connected at one of its ends to the inner bearing 121B of the rotary joint 121 and at its other end to the inner bearing 122B of the rotary joint 122. Similarly to link 103, link 102 and the remaining rigid links of the spherical linkage 12 may be formed of multiple integral members as illustrated in the figures, or, alternatively they may be formed of single curved members or solid blocks. The axis of the rotary joint 122 passes through the center point O, and remains at a fixed angle, for example 90 degrees, relative to the axis of joint 121. It should be clear that the angle formed by the axes of joints 121 and 122 is not necessarily limited to 90 degrees. As a result, link 103 is capable of rotating around the axes of joints 121 and 122, as indicated by the arrows F and G, respectively.

Link 104 is rigidly connected at one of its ends to the outer bearing 122A of joint 122, and at its other end to the outer bearing 123A of joint 123. The axis of the rotary joint 123 passes through the center point O, and remains at a fixed angle, for example 90 degrees, relative to the axis of joint 122. It should be clear that the angle formed by the axes of joints 122 and 123 is not necessarily limited 90 degrees. As a result, link 104 is capable of rotating relative to the axes of joints 122 and 123, as indicated by the arrows G and H, respectively.

Link 105A is rotatably connected at one of its ends to the inner bearing 123B of joint 123, and at its other end to the shaft 144B of the base joint A. The axis of the base joint A passes through the center point O. In this example, the shaft 144B of the base joint A coincides with its axis of rotation and the Cartesian coordinate axis Z—Z. The axis of rotary joint 123 remains at an angle, for instance normal to the axis of the base joint A. As a result, link 105A is restrained to rotate around the shaft 144B of the base joint A, as indicated by the arrow 1, while being capable of simultaneously rotating around the axis of link 123, as indicated by the arrow H.

The base joint A may be similar to the base joint B, and can drive and be backdriven by the endpoint D. The outer bearing elements of joints A, B and C may be connected to a common ground represented by the base link 101.

The first loop 140 is capable of spherical motion such that any particular point on any of the rigid links 102, 103, 104, 105A will be on the surface of a sphere centered at the center point O with a radius equal to the distance from that particular point to the center point O.

Figure 7:
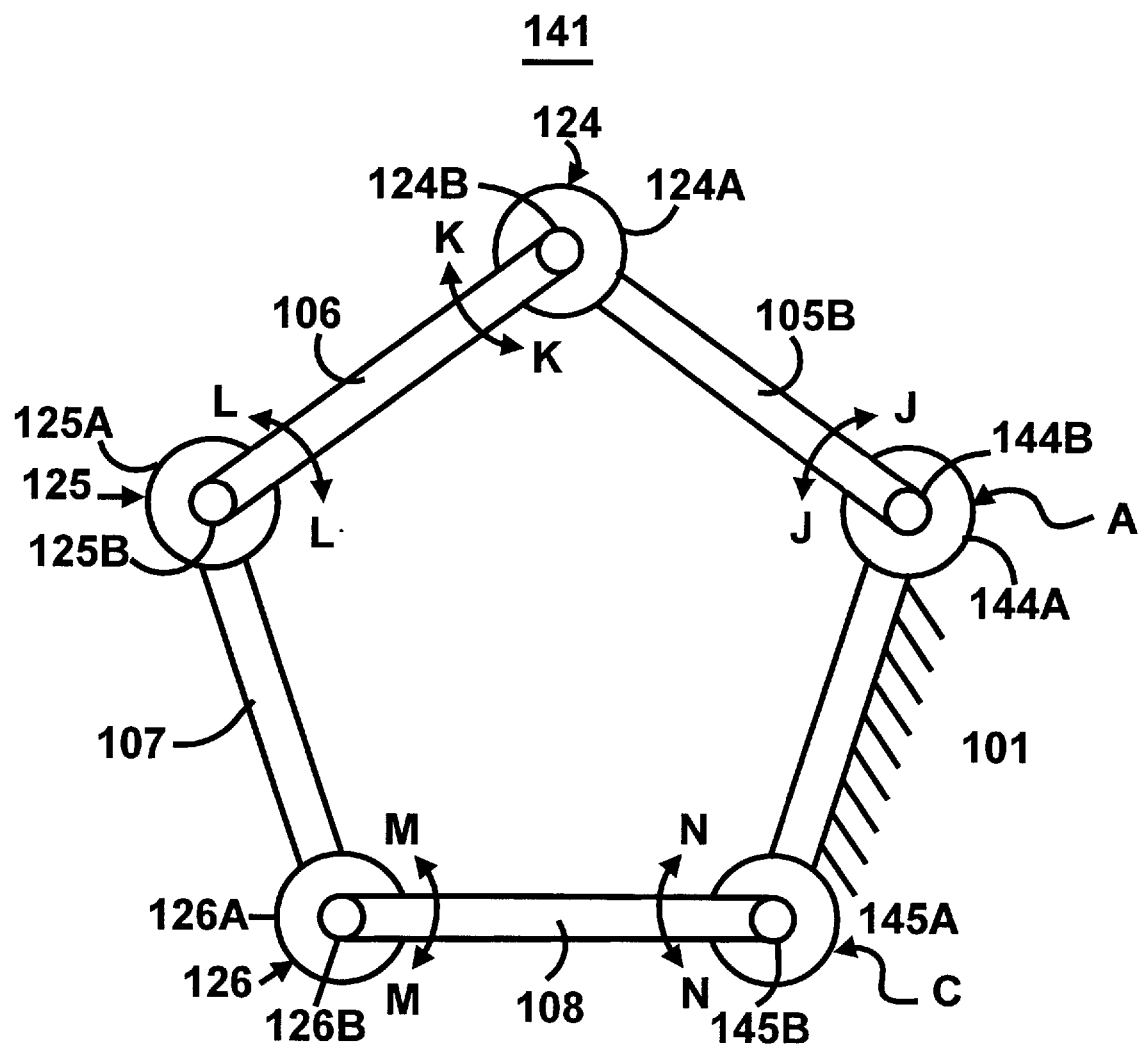
FIG. 7 is a simplified flat representation of the second closed loop of FIG. 5.

With reference to FIGS. 5 and 7, the second closed loop 141 is a five-link loop, and includes the base link 101 and four rigid links 105B, 106, 107, 108. Each of the five rigid links 101 and 105B through 108 is paired to an adjacent link by single degree of freedom rotary joints.

Link 105B is rotatably connected at one of its ends to the shaft 144B (FIG. 7) of the base joint A, and at its other end to the outer bearing 124A of the rotary joint 124. Link 105B may be formed of a single curved member or a solid block. In this example, the shaft 144B of the base joint A coincides with its axis of rotation as well as the Cartesian coordinate axis Z—Z. The axis of joint 124 passes through the center point O and remains at an angle, for instance perpendicular, though not necessarily, relative to the axis of the base joint A. As a result, link 105B is restrained to rotate around the shaft 144B of the base joint A, as indicated by the arrow J.

Link 106 is rotatably connected at one of its ends to the inner bearing 124B of joint 124 and at its other end to the inner bearing 125B of the rotary joint 125. The axis of joint 125 passes through the center point O, and remains at a fixed angle, for example 90 degrees, relative to the axis of joint 124. As a result, link 106 is capable of rotating around the axes of joints 124 and 125, as indicated by the arrows K and L, respectively.

Link 107 is rigidly connected at one of its ends to the outer bearing 125A of joint 125, and at its other end to the outer bearing 126A of joint 126. The axis of the rotary joint 126 passes through the center point O, and remains at a fixed angle, for example 90 degrees, relative to the axis of joint 125. It should be clear that the angle formed by the axes of joints 125 and 126 is not necessarily limited to 90 degrees. As a result, link 107 is capable of rotating around the axes of joints 125 and 126, as indicated by the arrows L and M, respectively.

Link 108 is rotatably connected at one of its ends to the inner bearing 126B of joint 126, and at its other end to the shaft 145B of the base joint C. The axis of the base joint C passes through the center point O. In this example, the shaft 145B of the base joint C coincides with its axis of rotation and the Cartesian coordinate axis X—X. The axis of joint 126 remains at an angle, for instance normal to the axis of the base joint C. As a result, link 108 is restrained to rotate around the shaft 145B of the base joint C, as indicated by the arrow N, while being capable of simultaneously rotating around the axis of link 126, as indicated by the arrow M.

The base joint C may be similar to the base joints A and B, and can drive and be backdriven by the endpoint D.

The second loop 141 is capable of spherical motion such that any particular point on any of the rigid links 105B through 108 will be on the surface of a sphere centered at the center point O with a radius equal to the distance from that particular point to the center point O.

The link lengths, link angles, and joint placements shown in FIG. 1 are, in general, chosen for convenience of illustration, and other equivalent link lengths, link angles and joint placements may optimize the work space characteristics, structural properties, or manufacturability of the mechanism 10. The link angles in the spherical linkage 12, and the link lengths of the planar linkage 14 satisfy closure conditions for each closed loop in the overall mechanism 10, and could be selected to broaden the reach envelope (i.e., the portion of the spherical work volume) of the mechanism 10 and to simplify its assembly. In addition, while reference is made herein to inner and outer bearing elements to the revolute joints, it should be clear that these bearing elements could be interchanged, and that the links joining the revolute joints may be connected to either the inner or the outer bearing elements without departing from the teaching of the present invention, even though reference is made herein to specific bearing elements for the purpose of illustration only.

Thus, in general, the spherical links can subtend any arbitrary angle between adjacent joints and the planar links can have any arbitrary length. As a result of this preferred embodiment, the mathematical description of the kinematics that expresses the relationship between Cartesian displacements of the endpoint D relative to the base joints (e.g., actuator or sensors) A, B, and C, is greatly simplified.

The mechanism 10 permits three degree of freedom actuation and measurement from rotary actuator/sensor assemblies that are mounted on a common base or ground link. Because all the base joints A, B, C (e.g., actuator/sensor assemblies) are mounted at a common ground, none of the outer bearing element (i.e., stator) weight and inertia needs to be carried. Since the moving weight and inertia are reduced, the size and power requirements for the base joints A, B, C (e.g., actuators) are reduced for robotic manipulators and force-reflecting human interface applications. Decreased inertia increases the structural bandwidth of the linkage, which, in turn, can improve the controller bandwidth and performance.

The mechanism 10 can be constructed solely from rigid links and revolute joint pairs. Furthermore, the revolute joints can all be embodied by very low friction and minimal backlash rolling contact bearings. The mechanism 10 does not require the use of other types of transmission element, such as cables and pulleys, belts and pulleys, chains and sprockets, gears, or lead screws and ball nuts, all of which commonly exhibit excessive friction, compliance, and/or backlash.

Since a robotic manipulator or force-reflecting interface depends on accurate actuation and measurement for purposes of control, minimizing the effects of backlash, friction, and compliance, and thereby improving force and displacement transmission characteristics would enhance the performance of the controlled linkage. These improvements are especially critical to the design of force-reflecting manual interfaces in which undesirable inertia, compliance, backlash and friction can all be easily felt by the operator, thereby hindering both the quality of haptic information being transferred to the human and as well as the accuracy of human generated command inputs.

In a practical implementation, the revolute or rotary joints of the disclosed spherical and planar linkages 12, 14, could be implemented with either bushings (e.g., Teflon® sleeve, sintered bronze, or hydrostatic types) or low friction rolling-contact bearings (e.g., ball, roller, or needle type). Furthermore, to promote the structural stiffness of the overall mechanism, each revolute joint needs to provide resistance against moments in any direction other than its own rotary axis. When off axis moments are expected to occur, for instance in the case of ball bearings, revolute joints are implemented in practice as back-to-back or face-to-face mounted pairs of bearings.

While base joints A, B, and C may be actuator/sensor combinations for the purpose of a controlled active manipulator or force-reflecting hand-controller, it is possible to eliminate the actuators or sensors from the mechanism design. Actuators such as motors can be replaced by dissipative elements such as electric brakes or passive dampers. With dissipative elements located at the base joints A, B, C, the mechanism 10 can be made suitable for use in hand controllers for vibratory environments (e.g., rotorcraft and heavy construction) and for attenuating involuntary human movement and bracing in precision manual work and in cases of neuromuscular impairment. In situations where neither active nor passive loading of the endpoint D are required, the base joints A, B, C denote fixed base rotary kinematic sensors that could provide measurement of motion at endpoint D.

Rather than being fixed rigidly at the end of link 110, the endpoint D can also be implemented as a freely-pivoting, passive (i.e., non-actuated), or active (i.e., actuated) three degree of freedom spherical mechanism with a new endpoint located at the sphere center D. The addition of three passive or active rotational degrees of freedom to the endpoint D would augment the three original degrees of freedom of the mechanism 10 to allow six degree of freedom motion (three rotational plus three translational degrees of freedom), and thus to enable mechanical coupling to any arbitrary rigid body kinematics that are within the augmented mechanism work space.

A further advantage of adding these three additional rotational degrees of freedom at the endpoint D is that moments and off-axis forces (couples) at D can no longer be transferred through the linkage 10 to, or from the base joints A, B and C. This spherical endpoint linkage 12 can be embodied in varying degrees of complexity, ranging from a single lower pair spherical joint (e.g., a rod-end bearing, with either significant backlash or friction), through to serial or fully parallel assemblies of links and revolute ball bearing joints.

When the passive spherical output links from two or more of these six degree of freedom mechanisms 10 are joined, either instantaneously by an external rigid body in contact with both mechanisms 10, or permanently by means of a fixed extension coupling both endpoints D, a new closed chain mechanism can be formed. This new combined mechanism would be attached to ground or one common base, and have up to six or more full active kinematic degrees of freedom at the extension joining the two original six degrees of freedom devices. The advantage of the resultant mechanism is that it can be actuated in all six degrees of freedom, whereas the original mechanism 10 has only three actuated degrees of freedom. While specific embodiments three degree of freedom mechanism have been illustrated and described in accordance with the present invention, modifications and changes will become apparent to those skilled in the art, without departing from the scope of the invention.

What is claimed is:

1. A three degree of freedom mechanism for use as a force reflecting interface or in a three dimensional robotic manipulator, comprising:

a three degree of freedom spherical linkage formed of a first and a second closed loop respectively and defining an endpoint S1 and an endpoint S;

said first and second closed loops being rotatably interconnected, and made of eight rigid links connected by nine single degree of freedom revolute joints;

three of said revolute joints being base joints and rotatably connected to a common base; a planar linkage connected to said endpoints S1 and S of said spherical linkage, said planar linkage including a third closed loop formed of five rigid links and revolute joints, the axis line passing through said revolute joints remaining parallel and forming a polygon; and wherein axis lines passing through said nine single degree of freedom revolute joints intersect at a common fixed center point O forming the center of a spherical work volume in which said endpoints S1 and S are capable of moving.

2. The mechanism according to claim 1, wherein said spherical linkage and said planar linkage are formed of ten rigid links and twelve revolute joints arranged in three closed chain loops of six binary links and four ternary links.

3. The mechanism according to claim 2, wherein said planar linkage further includes an endpoint D connected to said one of said revolute joints of said planar linkage.

4. The mechanism according to claim 3, wherein said center point O and said endpoint D define a virtual link VL whose length changes and permits said endpoint D to move to any point within a spherical work volume having point O as its center and VL as its radius.

5. The mechanism according to claim 4, wherein the maximum length of said virtual link VL is defined by the following equation:

$$VL(max)=R2+L1,$$

where R2 is the distance between an endpoint S and said center point O, and L1 is the distance between said endpoints S and D.

6. The mechanism according to claim 2, wherein said ternary links share a single revolute joint.

7. The mechanism according to claim 1, wherein said first closed loop includes four rigid links and a base link.

8. The mechanism according to claim 7, wherein said second closed loop includes four rigid links and a base link.

9. The mechanism according to claim 3, wherein said three base joints may drive and be backdriven by said endpoint D.

10. The mechanism according to claim 5, wherein said three base joints may drive and be backdriven by said endpoint S1 or said endpoint S.

11. The mechanism according to claim 9, wherein said three base joints are rotary actuators.

12. The mechanism according to claim 9, wherein said three base joints are sensors.

* * * * *